UNITED STATES PATENT OFFICE.

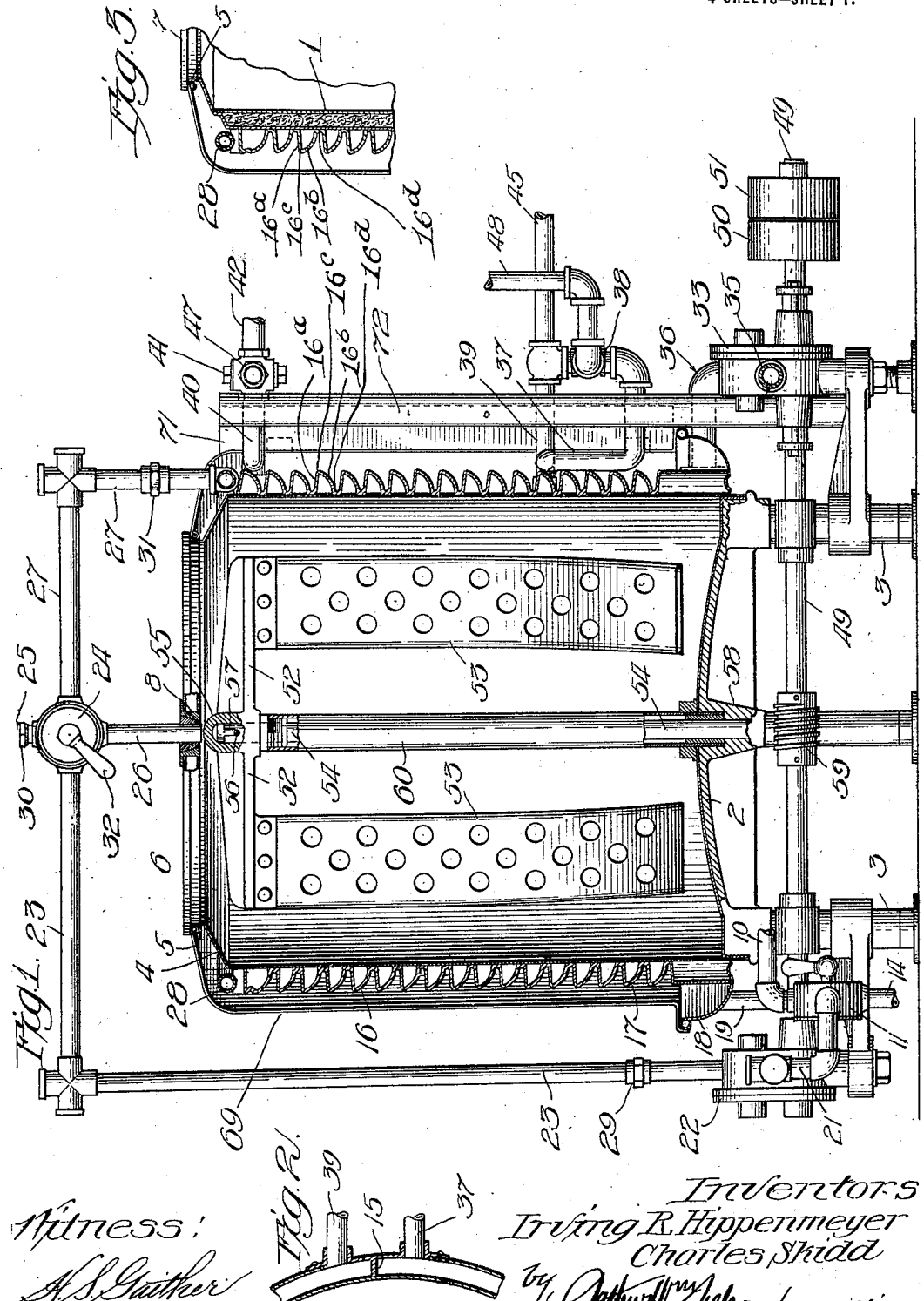

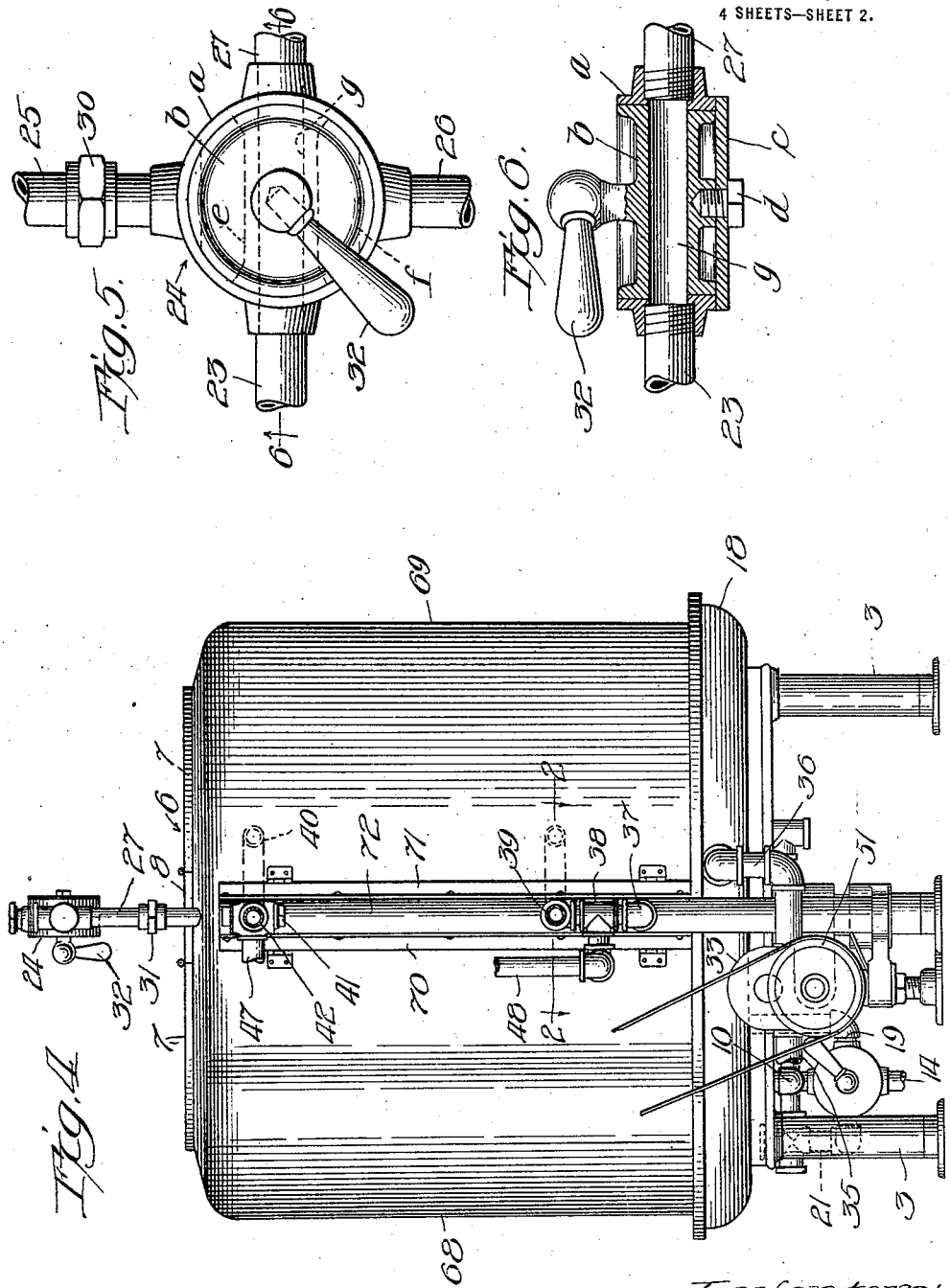

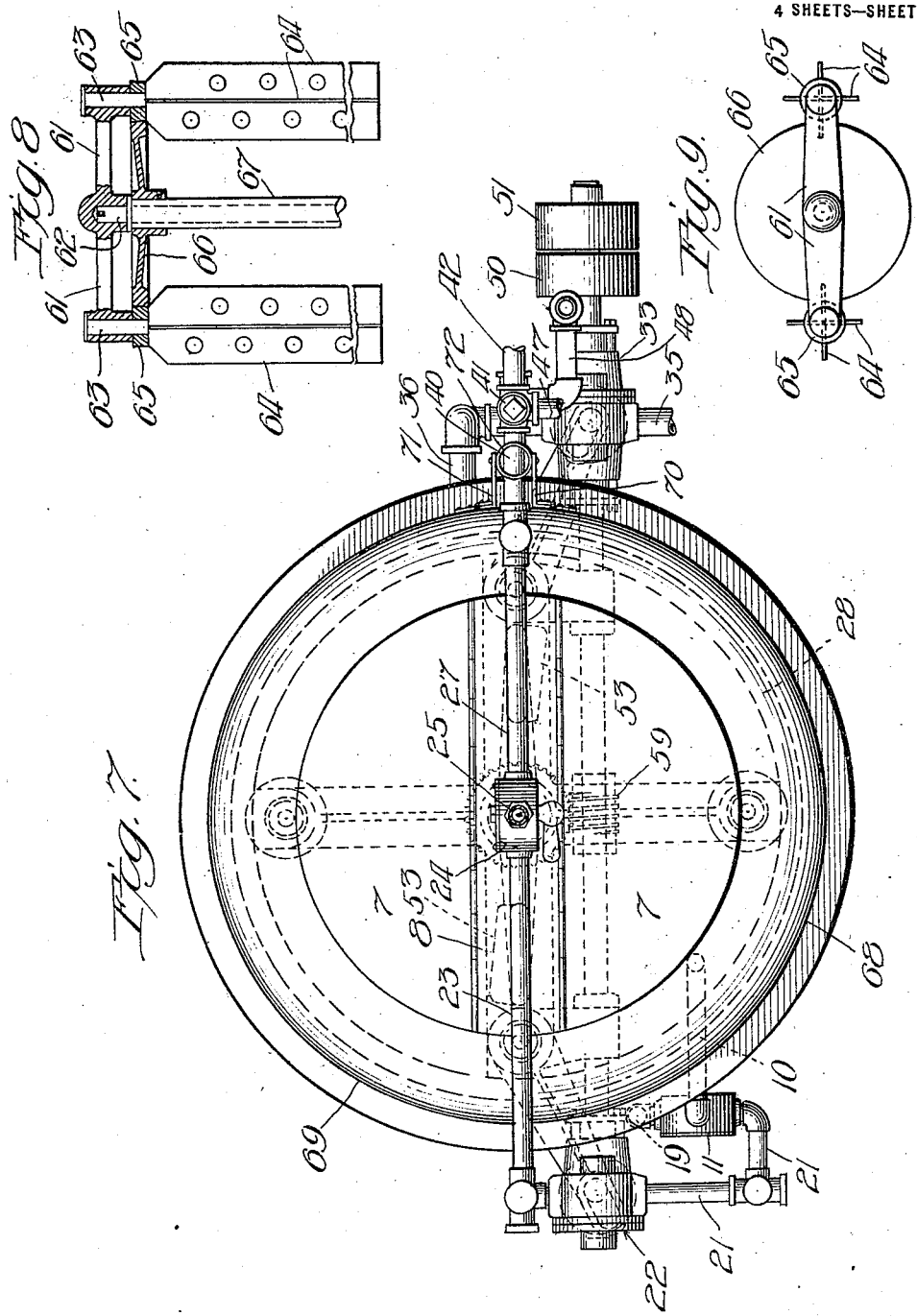

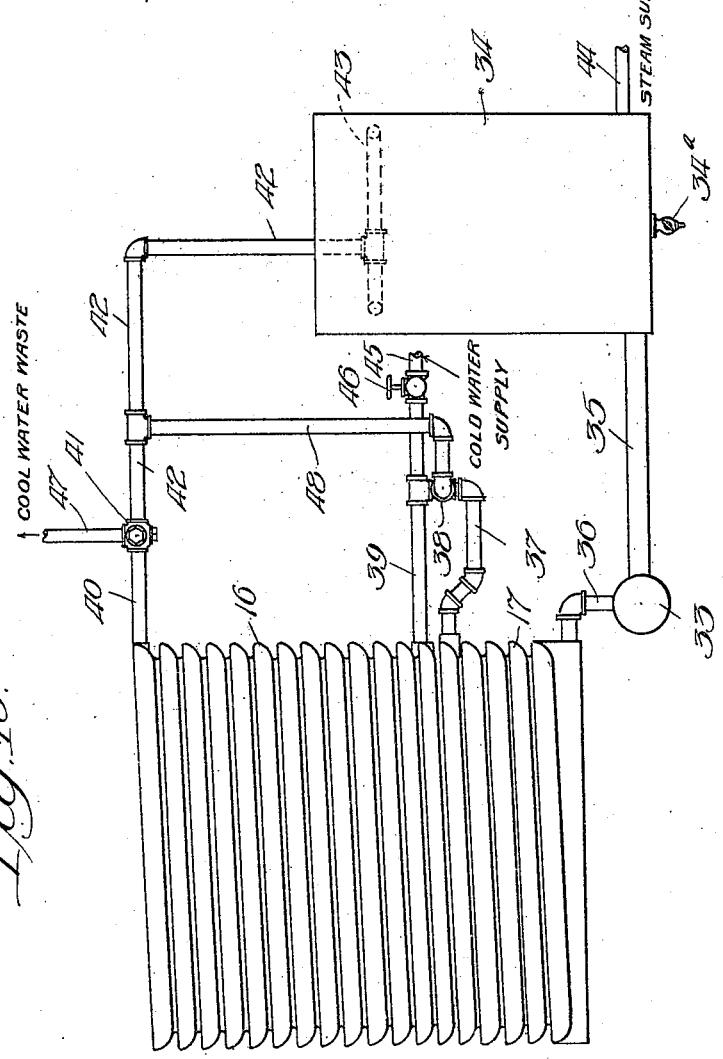

IRVING R. HIPPENMEYER AND CHARLES SKIDD, OF JANESVILLE, WISCONSIN, ASSIGNORS TO CHARLES SKIDD MANUFACTURING COMPANY, OF JANESVILLE, WISCONSIN.

PASTEURIZER.

1,412,115.  Specification of Letters Patent.  Patented Apr. 11, 1922.

Application filed December 11, 1918. Serial No. 266,248.

*To all whom it may concern:*

Be it known that we, IRVING R. HIPPENMEYER and CHARLES SKIDD, citizens of the United States, residing at Janesville, in the county of Rock and State of Wisconsin, have invented certain new and useful Improvements in Pasteurizers, of which the following is a specification.

Pasteurization, as practically carried on, consists of heating the liquid to be pasteurized to a temperature that will destroy all, or nearly all of the harmful bacteria and then cooling the liquid to a temperature sufficiently low to prevent the spores from germinating. Pasteurization may be "continuous" or "intermittent." In the former the "raw" liquid flows into the apparatus, is pasteurized, cooled and flows out of the apparatus in a continuous stream. In the intermittent or "batch" system, a certain amount of liquid is put into the machine, is pasteurized and cooled and then taken out.

Again, pasteurization may be carried on by either the "flash" or the "holding" process. In the "flash" system the liquid is heated to a temperature sufficiently high to instantaneously kill the bacteria, and is then immediately cooled, while in the "holding" process a lower temperature is maintained for a period of 20 or 30 minutes, after which the milk is cooled. Either the "flash" or the "holding" process may be applied to either the "batch" or "continuous" type of machine.

The temperature for pasteurization varies greatly but in general the temperature must be increased as the period of exposure decreases. Hence it is necessary to raise the liquid to a much higher degree of temperature in the "flash" method than in the "holding" method. For example—for the pasteurization of milk by the "flash" method a temperature of 160 degrees F. to 165 degrees F. is required for good results while by the "holding" method, when held for a period of from 20 to 30 minutes, a temperature of 140 degrees F. to 145 degrees F. is sufficient.

As is well known there is a critical temperature at which the bacteria will not only be destroyed but the character of the milk changed which gives preference to the holding method with its lower prevailing temperature. But the holding method has heretofore met practical objections because of the size and character of the machine necessary to pasteurize the required volume of liquid.

Our invention relates generally to an apparatus for pasteurizing milk, cream, or similar liquids and relates more particularly to an apparatus for the pasteurization of such liquids under the "batch or holding method."

The general object of our invention is to provide a more compact intermittent pasteurizer wherewith it shall be possible to heat, hold for the desired period and then cool the pasteurized liquid.

A further object of our invention is to provide a single unitary structure of such form that it shall serve the combined functions of heating, holding, and then cooling the liquid.

Other objects of our invention are to provide a pasteurizer with a minimum number of moving parts; in which the pasteurizing surfaces shall be readily accessible and of such form that they may be easily and thoroughly cleaned; in which the liquid to be pasteurized shall be retarded in its passage over the heating and cooling surface to the end that a maximum thermic transmission may be attained in a relatively small machine; and in which the parts shall be of such simple and substantial form that they may be cheaply built and inexpensively maintained.

Our invention consists generally in a pasteurizer of such form and construction that the above named objects, together with others that will appear hereinafter, are attainable and our invention will be more readily understood by reference to the accompanying drawings wherein:

Figure 1 is a vertical view of the pasteurizer, partly in elevation and partly in section and with some parts broken away for the sake of clearness. Fig. 2 is a fragmentary sectional detail view taken on line 2—2 of Fig. 4. Fig. 3 is a fragmentary vertical sectional view showing one way of insulating the liquid holding chamber. Fig. 4 is a side elevation of the pasteurizer. Fig. 5 is a fragmentary detail view of one of the valves employed. Fig. 6 is a sectional view through the same taken on line 6—6 of Fig. 5. Fig. 7 is a top plan view of the pasteurizer. Fig. 8 is a fragmentary detail view showing an alternate form of agitator. Fig. 9 is a top plan view of the agitator shown in Fig. 8. Fig. 10 is a diagrammatic view of an apparatus showing among other operative connections, the pasteurizer connected up with a tempering fluid supply tank.

The embodiment of the invention herein shown comprises a cylinder, 1, which may be of sheet metal. If desired, the cylinder, which serves as a liquid holder, may be insulated as indicated in Fig. 3. The lower end of the cylinder is secured to and closed by a head or base, 2, said base being supported by any suitable means, as, for example, a plurality of legs, 3. Attached to the upper end of the cylinder, 1, is an inwardly and upwardly extending flange, 4, defining an opening, 5. Said opening is normally closed by a cover, 6, consisting of two sections, 7, hinged to a central section 8.

An outlet pipe, 10, extends from the lower head or base, 2, to a valve, 11. Said valve comprises a valve member having a port which is adapted to connect the pipe, 10, to an outlet pipe, 14. The pipe, 14, may lead to a bottle filler or any other desired point.

Surrounding the cylinder, 1, and attached thereto, is a helical conductor for the tempering fluids. While this conductor may be of any suitable construction, it is preferably constructed so as to have an approximately horizontal upper surface, 16$^a$, a curved under surface, 16$^b$, and gently curved connecting portions, 16$^c$, and 16$^d$, as is best shown in Fig. 1. This construction provides one in which the milk flow is retarded thus enabling a greater thermic transmission between the milk and the tempering fluid and in which at the same time because of the gentle undulatory shape does not pocket the milk in a manner to cause it to coagulate or burn and furnishes a surface that can be easily and thoroughly cleaned. It should be noted also that the wall of the holding chamber serves as one wall for the temperating liquid conduit thus reducing the cost and simplifying the manufacture thereof (see Fig. 1).

In this conductor is inserted a casting providing necessary pipe connections as well as partition or plug 15 (Fig. 2) which practically divides the conductor into an upper conductor 16 and a lower conductor 17. The means for circulating tempering fluids through these conductors will be hereinafter described.

Surrounding the lower portion of the cylinder is a milk-collecting trough 18. The trough is connected by means of a pipe 19 to the valve 11. The valve member of said valve is provided with a passage which is adapted to connect the pipe 19 with a pipe 21 that is connected to the intake of a milk pump 22. 23 is a line of pipe through which the pump 11 discharges milk to a valve 24. This pipe may be insulated, if desired. The valve 24 may be identical in construction with the valve 11. 25 is a milk supply pipe connected to the valve 24. 26 is a pipe extending from the valve 24 through the portion 8 of the cover so as to discharge milk into the cylinder 1, 27 is a pipe extending from the valve 24 to an annular milk-distributing pipe 28 that overlies the cylinder 1 and is so perforated as to discharge the milk upon the upper end of the conductor 16. In the pipes 23, 25 and 27 are unions 29, 30 and 31 to permit of disconnecting and removing the pipes 23 and 27 and the valve 24 when the agitator hereinafter described is to be removed from the chamber 1. The movable valve member of the valve 24 is provided with a handle 32 by means of which said valve member may be set to connect the supply pipe 25 to the pipe 27. Said valve member at the same time connects the pipe 23 to the pipe 26.

The means for supplying hot water to the conductors 16 and 17 comprises a pump 33, the inlet of which is connected to a tank 34 (Fig. 10) by means of a pipe 35. The discharge side of the pump is connected by means of a pipe 36 to the lower portion of the conductor 17. The upper portion of the conductor 17 is connected by means of a pipe 37 to a three-way valve 38, said valve being connected to the lower end of the conductor 16 by means of a pipe 39.

To the upper end of the conductor 16 is connected a pipe 40 which leads to a three-way valve 41. Said valve is connected by means of a pipe 42 to a suitable sprayer or jet-head 43 herein shown as consisting of a perforated circular pipe, said pipe being located within the upper portion of the tank 34. A steam pipe 44 supplies steam to heat the water in the tank 34. The system my be drained of hot water in any suitable way, as by means of a drain cock 34$^a$ on the tank 34.

In cooling the milk, cold water from a suitable supply, such as the city main, is passed through the upper conductor 16, and brine or ice water is circulated through the lower conductor 17. 45 is a cold water supply pipe connected to any suitable source of supply of cold water. 46 is a shut-off valve in said pipe. The pipe 45 is connected to the pipe 39 so as to supply water to the lower end of the upper conductor 16. The valve 41 is connected to a waste pipe 47.

When brine or ice water is being pumped from the tank 34 through the pipes 35 and 36 into the lower end of the lower conductor 17, the brine or ice water leaves the upper end of said conductor through the pipe 37 and passes thence through the three-way valve 38, a pipe 48, the pipe 42, and the spray pipe 43 to the tank 34.

The milk pump 22 and the pump 33 are driven from a shaft 49 carrying a tight pulley 50 and a loose pulley 51.

Any suitable means may be provided to agitate the contents of the cylinder 1. In Fig. 1 is shown an agitator comprising two arms 52 carrying perforated blades 53, said arms being detachably secured to the upper end of a shaft 54. Herein the arms 52 are shown as having a socket 55 which fits upon the upper end of the shaft 54. 56 is a pin fixed in the socket 55 and resting in a slot 57 in the upper end of the shaft. Said shaft is supported axially of the cylinder 1, being mounted in a bearing 58 on the base 2. To the lower end of the shaft is secured a worm wheel (not shown) that meshes with a worm 59 carried by the shaft 49. 60 is a tube fixed at its lower end to the base 2 and enclosing the shaft 54. If desired, the blades 53 may be curved forwardly, as indicated in Figs. 1 and 7.

In Figs. 8 and 9 is shown an alternative form of agitator comprising arms 61 detachably secured to the upper end of the shaft 62. There are bearings at the outer ends of the arms to support vertical shafts 63 which carry blades or agitating elements 64. Fixed to each of the shafts 63 is a friction wheel 65 that makes contact with a friction disk 66 which is stationarily secured to the upper end of the shaft-enclosing tube 67. It will be seen that when the shaft 62 is rotated, the agitating elements 64 will be given an orbital movement around the shaft 62 and will also be rotated upon their axes.

Preferably, the conductors 16 and 17 are provided with an enclosing casing or mantle which may be of any suitable construction. Herein the mantle is shown as consisting of two hinged sections 68 and 69 arranged to be swung apart to provide access to the outside of the conductors 16 and 17, the trough 18 and the pipe 28. Said sections are hinged to a suitable upright support, as, for example, two bars 70 and 71 fixed to a tubular post 72.

While the four-way valves 11 and 24 may be of any suitable type, we have herein shown a construction comprising a casing a (Fig. 6) having four pipe connections on its periphery. Said casing has a tapered chamber to receive a correspondingly tapered valve plug b which is held in place by a cap plate c and a screw d. In the plug b is a port e to connect two pipes (as, for example, 25 and 27), a port f to connect two other pipes (as 23 and 26), and a port g to connect two opposite pipes (as 23 and 27).

The operation is as follows: The tank 34 is filled with hot water; the valve 38 is set to connect the pipes 37 and 39; the valve 41 is set to connect the pipes 40 and 42; and the shaft 49 is driven. The valve 24 is operated to connect the milk supply pipe 25 to the pipe 27, and to connect the pipe 23 to the pipe 26. The valve 11 is set to connect the pipe 19 to the pipe 21, and to close the pipes 10 and 14. Milk flows from the pipe 25 to the pipe 27, being discharged by the pipe 28 upon the outer surface of the upper turn of the conductor 16. As the milk flows down the heated conductors, 16 and 17, it is heated to the pasteurizing temperature. The milk is collected in the trough 18 and flows thence through the pipe 19 to the pipe 21, the pump 22 forcing the milk through the pipes 23 and 26 to the interior of the cylinder 1. When the cylinder is full, the valve 24 is operated to shut off the supply pipe 25 and to connect the pipes 23 and 27. The milk is allowed to remain in the cylinder 1 for a sufficient length of time (say, twenty or thirty minutes) to insure the destruction of pathogenic bacteria.

The hot water having been drained from the tank 34 and the conductors 16 and 17, a quantity of ice and water is placed in the tank; the valve 38 is set to connect the pipes 37 and 48; the valve 46 is opened to admit cold water; and the valve 41 is set to connect the pipe 40 to the waste pipe 47. Cold water is thereby forced through the upper conductor 16. The pump 33 is actuated to circulate ice water or brine through the tank 34, pipes 35 and 36, conductors 17, pipes 37, 48 and 42 and the sprayer 43 back to the tank.

The valve 11 is then set to connect the pipe 10 to the pipe 21, and to place the pipes 19 and 14 in communication with each other. The heated milk then flows through the pipes 10 and 21 to the pump 22; the latter serving to force the milk through the pipes 23 and 27 to the distributing pipe 28. In flowing down over the cold conductors 16 and 17, the milk is cooled to the desired temperature. It is collected in the trough 18 and flows through the pipes 19 and 14 to the bottle filler or other desired point.

Experience has shown that the apparatus herein disclosed is very efficient in heating, holding and cooling milk, cream and the like. All parts that come in contact with milk are readily accessible for cleaning.

It will be understood that the arrangement illustrated in Fig. 10 is merely diagrammatic, and that any suitable means for supplying tempering fluids may be employed.

In the following claims we have used the term "milk" to denote milk, cream and similar liquids.

We claim as our invention:

1. A pasteurizing apparatus having, in combination, a milk-holding chamber; a tempering fluid conductor; means for supplying hot and cold fluids to said conductor; means for discharging milk upon the upper portion of said conductor; a trough adjacent to the lower portion of the conductor; an outlet pipe; piping connecting the chamber, the discharging means, the trough and the outlet pipe; and valve means controlling the flow of milk through said piping.

2. A pasteurizing apparatus having, in combination, a milk holding chamber; a tempering-fluid conductor surrounding the chamber; means for supplying hot and cold fluids to said conductor; means for discharging milk upon the upper portion of said conductor; a trough adjacent to the lower portion of the conductor; an outlet pipe; piping connecting the chamber, the discharging means, the trough and the outlet pipe; and valve means controlling the flow of milk through said piping.

3. A pasteurizing apparatus having, in combination, a milk-holding chamber; a tempering-fluid conductor; a milk-collecting trough near the lower portion of the chamber; means for discharging milk upon the upper portion of said conductor, and means for conducting milk from the trough to said chamber and for conducting milk from said chamber to said discharging means.

4. A pasteurizing apparatus having, in combination, a milk-holding chamber; a tempering-fluid conductor surrounding the chamber; a milk-collecting trough surrounding the lower portion of the chamber; means for discharging milk upon the upper portion of said conductor, and means for conducting milk from the trough to said chamber and for conducting milk from said chamber to said discharging means.

5. A pasteurizing apparatus having, in combination, a milk-holding chamber; an upper and a lower tempering-fluid conductor; means for establishing and breaking communication between the adjacent ends of said conductors; means for supplying tempering fluids to the conductors; means for discharging milk upon the upper conductor, and means for conducting the milk from a point adjacent to the lower conductor to said chamber.

6. A pasteurizing apparatus having, in combination, a milk-holding chamber; an upper and a lower tempering-fluid conductor surrounding the chamber; means for supplying tempering fluids to the conductors; means for discharging milk upon the upper conductor, and means for conducting the milk from a point adjacent to the lower conductor to said chamber.

7. A pasteurizing apparatus having, in combination, a milk-holding chamber; an upper and a lower tempering-fluid conductor surrounding the chamber; means for establishing and breaking communication between the adjacent ends of said conductors; means for supplying tempering fluids to the conductors; means for discharging milk upon the upper portion of the upper conductor, and means for conducting the milk from a point adjacent to the lower portion of the lower conductor to said chamber.

8. A pasteurizing apparatus having, in combination, a milk-holding chamber; a tempering-fluid conductor; a milk distributor for discharging milk upon said conductor; a milk-collecting trough near the lower portion of the conductor; a milk pump; a milk supply pipe; a milk outlet; means for alternately connecting the pump to the milk distributor and said chamber; and means for connecting the trough to the pump when heating and for connecting the chamber to the pump and the trough to the outlet when cooling.

9. A pasteurizing apparatus having, in combination, a milk-holding chamber; a milk heater and cooler; means for supplying milk to said heater and cooler; a milk-receiving element associated with the heater and cooler; a milk pump; a milk outlet; means for alternately connecting the pump to the milk-supplying means and said chamber, and means for connecting the receiving element to the pump when heating and for connecting the chamber to the pump and the receiving element to the outlet when cooling.

10. A pasteurizing apparatus having, in combination, a milk-holding chamber; a tempering-fluid conductor surrounding the chamber; a milk distributor for discharging milk upon the upper portion of said conductor; a milk-collecting trough near the lower portion of the conductor; a milk pump; a milk-supply pipe; a milk outlet; means for alternately connecting the pump to the milk distributor and said chamber, and means for connecting the trough to the pump when heating and for connecting the chamber to the pump and the trough to the outlet when cooling.

11. A pasteurizing apparatus having, in combination, a milk-holding chamber; a milk heater and cooler; means for supplying milk to said heater and cooler; a milk-receiving element associated with the heater and cooler; a milk pump; a feed pipe; a pipe leading to said milk-supplying means; a pipe leading to the milk-holding chamber; a pipe leading from the pump; a four-way valve controlling all of said pipes; a pipe extending from said receiving element; a pipe extending from said chamber; a pipe leading to the pump; an outlet pipe, and a four-way valve controlling the last-mentioned four pipes.

12. A pasteurizing apparatus having, in combination, a milk-holding chamber; a milk heater and cooler; means for supplying milk to said heater and cooler; a milk-receiving element associated with the heater and cooler; a milk pump connected to said receiving element; a feed pipe; a pipe leading to said milk-supplying means; a pipe leading to the milk-holding chamber; a pipe leading from the pump, and a four-way valve controlling all of said pipes.

13. A pasteurizing apparatus having, in combination, a milk-holding chamber; a milk heater and cooler; a milk-receiving element associated with the heater and cooler; a milk pump; a pipe extending from said receiving element; a pipe extending from said chamber; a pipe leading to the pump; an outlet pipe, and a four-way valve controlling all of said pipes.

14. In a pasteurizer, a milk-holding chamber, a tempering fluid conductor on the exterior of said chamber over which the milk to be treated is caused to flow, and a casing surrounding said conductor and comprising two sections hinged so as to be swingable to permit access to the conductor.

15. In a pasteurizer, a milk-holding chamber, a tempering fluid conductor on the exterior of said chamber over which the milk to be treated is caused to flow, a trough below said conductor for collecting the milk therefrom, and a casing surrounding said conductor and arranged to cover said trough, said casing comprising a plurality of hinged sections swingable to permit of access to the conductor and trough.

16. A combined pasteurizer, holder, and cooler comprising a milk holder, a unitary device for heating and cooling milk encompassing the holder, and means for conducting milk from the device to the holder and back to the device.

17. A combined pasteurizer, holder, and cooler comprising a milk holder, a unitary heating and cooling device encompassing the holder and having one wall thereof formed by the wall of the holder, and means for conducting milk from the device to the holder and back to the device.

18. A pasteurizing apparatus having, in combination, a milk-holding chamber; a tempering fluid conductor surrounding the chamber and having one wall thereof formed by the wall of the holding chamber; means for discharging milk upon the upper portion of said conductor, and means for conducting the milk from a point adjacent the lower portion of the conductor to said milk-holding chamber.

19. A pasteurizing apparatus having, in combination, a milk-holding chamber; a tempering fluid conductor of helical-like form surrounding the chamber, the convolutions thereof having substantially horizontal upper surfaces and a curved under surface, and means for conducting the milk from the tempering conductor to the milk-holding chamber and back to the tempering conductor.

20. A combined pasteurizer, holder, and cooler comprising a milk holder, a unitary device for heating and cooling milk encompassing the holder and presenting a somewhat undulatory outer surface and means for conducting milk from the device to the holder and back to the device.

In testimony whereof we have hereunto set our hands.

IRVING R. HIPPENMEYER.
CHARLES SKIDD.